United States Patent [19]
Braun

[11] 4,260,254
[45] Apr. 7, 1981

[54] COMPACT BORESIGHT TESTER FOR LASER DESIGNATORS

[75] Inventor: Leroy O. Braun, Redondo Beach, Calif.

[73] Assignee: Hughes Aircraft Company, Culver City, Calif.

[21] Appl. No.: 34,117

[22] Filed: Apr. 30, 1979

[51] Int. Cl.³ .................. G01B 11/27; G02B 17/00
[52] U.S. Cl. ........................... 356/154; 350/444; 356/153; 356/247
[58] Field of Search .............. 356/153–154, 356/247, 254–255; 350/10–11, 29, 201, 69, 78; 250/351; 33/286

[56] References Cited

U.S. PATENT DOCUMENTS

| | | | |
|---|---|---|---|
| 1,053,512 | 2/1913 | Huntoon et al. | 350/252 |
| 2,347,702 | 5/1944 | Maris | 356/154 |
| 2,394,894 | 2/1946 | Burgert et al. | 350/252 |
| 2,730,926 | 1/1956 | Back et al. | 350/201 |
| 4,139,769 | 2/1979 | McCrum et al. | 250/339 |

FOREIGN PATENT DOCUMENTS 13571 of 1910 United Kingdom ................ 356/247

OTHER PUBLICATIONS

Maksutov, D. D., "New Catadioptric Meniscus Systems", Jr. Optical Soc. America, 5-1944, pp. 278–279.
Hayes et al., "Optical X-Ray Focusing & Alignment", IBM Tech. Disc. Bulletin, vol. 15, 3-1973, pp. 3202.

*Primary Examiner*—John K. Corbin
*Assistant Examiner*—Wm. H. Punter
*Attorney, Agent, or Firm*—Paul M. Coble; W. H. MacAllister

[57] ABSTRACT

A simple and compact testing device is disclosed for enabling the boresight alignment of a laser designator to be quickly and readily checked. The device includes a tubular housing having a closed end and an open end adapted to be attached to the designator. A target disk and a converging meniscus lens provided with a reflective coating on its surface facing the target disk are snugly disposed within the housing adjacent to its closed and open ends, respectively, with a tubular spacer member interposed between and abutting the target disk and the lens. A portion of the laser light emitted from the designator is directed by the lens toward the target disk such that after a predetermined number of reflections from the target disk and the coating on the lens this laser light is focused to a small area on the target disk. The target disk emits visible light which travels back into the designator to provide an indication of the location of the spot of impingement of the laser light on the target disk.

5 Claims, 4 Drawing Figures

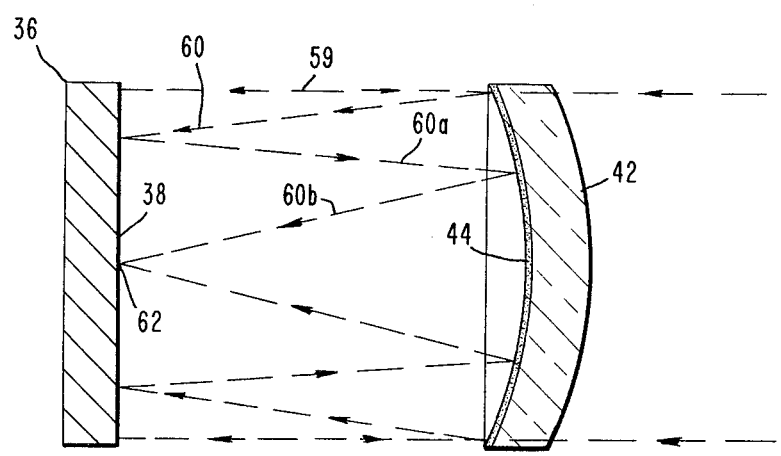
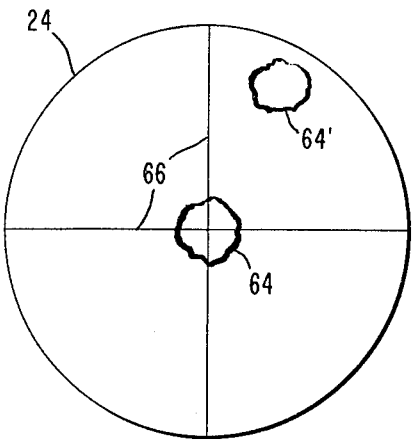
Fig. 4.

COMPACT BORESIGHT TESTER FOR LASER DESIGNATORS

BACKGROUND OF THE INVENTION

1. Field of the Invention

The present invention relates to boresight alignment testing, and more particularly it relates to a simple and compact device for attachment to a laser designator which enables the boresight alignment of the designator to be quickly and readily checked.

2. Description of the Prior Art including Prior Art Statement

Laser designators have been employed to direct a laser beam onto a target in order to illuminate the target so that it may be fired at from a location remote from that of the designator. Since laser designators can be readily portable, they may be carried by a user over rugged terrain to locations where it would be undesirable or even impossible to locate larger and bulkier equipment.

It is desirable for the user of a laser designator to be able to periodically test the boresight alignment of the designator to make sure that the emitted laser beam is accurately aligned with the reticle in the optics through which the user sights the target. In the prior art, equipment for carrying out such boresight alignment testing was relatively bulky, heavy, and expensive.

Exemplary boresight alignment testing apparatus of the prior art is disclosed in U.S. Pat. No. 4,139,769 to E. F. McCrum et al. In the apparatus disclosed in this patent, a rotatably mounted boresighting system is adapted to be moved between a "stow" position and a "boresight" position. When in the boresight position, an infrared laser beam is reflected by a rhomboid pair of mirrors and a parabolic mirror onto a focal point on target material, and upon absorption of the infrared laser radiation, the target material emits radiation in both visible and infrared wavelength bands. The mirror system directs a central portion of the radiation emitted by the target material to a visible band detector and directs another portion of this radiation to an infrared band detector. The apparatus of U.S. Pat. No. 4,139,769 is especially suitable for use aboard aircraft to sense distant images and present these images to the pilot on a CRT display. It does not lend itself for in-the-field checking of the boresight alignment of a portable laser designator.

SUMMARY OF THE INVENTION

It is an object of the present invention to provide a small, light, inexpensive, and simple-to-use device for testing the boresight alignment of a laser designator.

It is another object of the invention to provide a compact boresight alignment tester especially suitable for in-the-field use with a portable laser designator.

It is a further object of the invention to provide a laser designator boresight alignment tester of the foregoing type which additionally is rugged and durable.

A boresight tester according to the invention includes a housing having a closed end and an open end adapted to be attached to a laser designator to be tested. A target member disposed within the housing adjacent to its closed end defines a target surface facing the open end. The target surface is of a material capable of emitting visible light when irradiated with laser light. A lens disposed within the housing at a location spaced from the target member is provided with a reflective coating on its surface facing the target surface. A hollow spacer member is disposed within the housing between the target member and the lens in abutting relationship with the target member and the lens.

A portion of the laser light entering the housing through its open end is directed by the lens toward the target surface such that after a predetermined number of reflections from the target surface and the coating on the lens this laser light is focused to a small area on the target surface. Visible light emitted from the target surface provides an indication of the location of the area of impingement of the laser light on the target surface.

Additional objects, advantages, and characteristic features of the invention will become apparent from the following detailed description of a preferred embodiment of the invention when considered in conjunction with the accompanying drawings.

BRIEF DESCRIPTION OF THE DRAWINGS

In the accompanying drawings:

FIG. 3 is a schematic view illustrating an exemplary light path through the tester of FIG. 2; and FIG. 4 is an illustration of exemplary reticle displays for aligned and misaligned designator boresights as observed during the operation of a boresight tester according to the invention.

DESCRIPTION OF A PREFERRED EMBODIMENT

Figure 1:
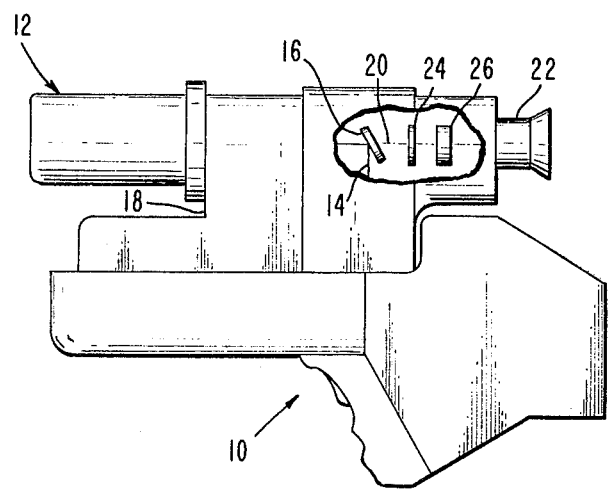
FIG. 1 is a side view, partly broken away, illustrating a boresight tester according to the invention operatively mounted on a laser designator.

Referring to FIG. 1 with greater particularity, a laser designator 10 is shown having a boresight tester 12 according to the invention attached thereto so as to permit a boresight alignment test operation to be performed. The laser designator 10 includes a laser generator (not shown) for generating a laser beam 14 which is directed toward a beam splitter 16. Most of the laser beam 14 is reflected by the beam splitter 16 toward an output surface 18 of the designator which contains a window (not shown) through which the laser beam exits from the designator 10. During normal operation of the designator 10, the window is not covered so that the exiting laser beam is allowed to travel toward a desired target. However, during a boresight testing operation, the tester 12 is attached to the designator 10 adjacent to its output surface 18 so that the laser beam exiting from the designator 10 enters the tester 12.

Disposed at the opposite end of the designator 10 from the beam-exit window and aligned therewith along an axis 20 coincident with the laser beam path is an eyepiece 22 through which a user of the designator 10 may sight a desired target. Disposed along the axis 20 between the beam splitter 16 and the eyepiece 22 is a reticle member 24 and an optical filter 26. The filter 26 is opaque to the generated laser wavelength (or wavelengths) to insure that the laser radiation will not reach the user's eye, while being sufficiently transparent to visible radiation to enable the user to readily observe the target. As a specific example for illustrative purposes, when the designator 10 employs a neodymium laser, the filter 10 may block wavelengths in the vicinity of 1.06 $\mu$m while allowing white light to pass through.

Figure 2:
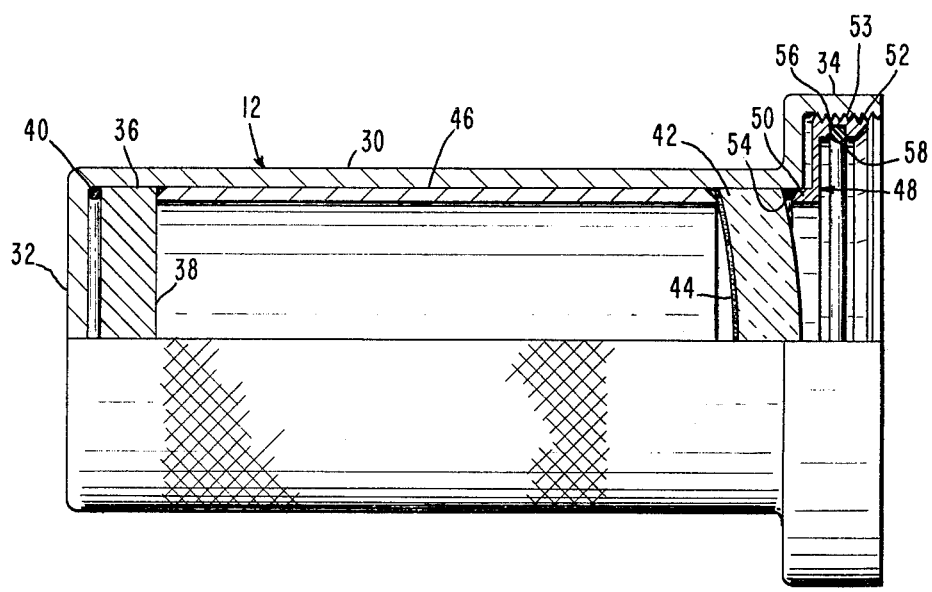
FIG. 2 is a longitudinal view, partly in section, showing a boresight tester according to the invention.

Referring to FIG. 2, the boresight tester 12 may be seen to include a tubular housing 30 of a light but rugged material such as aluminum or an aluminum alloy and having a closed end 32. The opposite end of housing 30, which in use is attached to the designator 10, defines a ring portion 34 having a diameter greater than that of the remainder of the housing 30. Snugly fitting within the housing 30 adjacent to its closed end 32 is a disk 36 which functions as a reflective target during the boresight testing operation. The disk 36 has a reflective surface 38 facing the open end of the housing 30 and is of a material such that when focused laser light from the designator 10 impinges upon a spot on the surface 38, visible light will be emitted from this spot. A specific exemplary material which may be employed for the disk 36 is polished stainless steel, although it should be understood that alternate materials are also suitable and may be employed instead. Moreover, although the disk 36 is illustrated as having a planar reflective surface 38, alternatively, the surface 38 may be curved in either a convex or concave manner. In order to facilitate firm, shock-resistant support of the disk 36 within the housing 30, an O-ring 40 may be snugly disposed between the disk 36 and the housing closed end 32.

Snugly fitting within the region of the housing 30 just inwardly of the enlarged ring portion 34 is a converging lens 42 for directing a portion of the laser light from the designator 10 toward the target surface 38 such that after a predetermined number of reflections from the target surface 38 and a reflective coating on the surface of the lens 42 facing the target disk 36 this laser light is focused to a spot on the target surface 38. It is pointed out that although the lens 42 is illustrated as a converging meniscus lens in FIG. 2, other lens configurations such as plano-concave, biconcave, and biconvex may be employed instead, as long as the lens 42 together with the target disk 36 is capable of focusing input laser light onto a spot on the target surface 38. A converging meniscus lens is preferred, however, because it minimizes chromatic aberrations.

In order to maximize the amount of laser light impinging upon the target surface 38, the surface of the lens 42 facing the target surface 38 is provided with a dielectric coating 44 of good reflectivity for both light at the laser wavelength emitted by the designator 10 and at visible wavelengths. A spacer tube 46 is snugly disposed within the housing 30 between the target disk 36 and the lens 42 and in abutting relationship with the disk 36 and the lens 42. The spacer tube 46 is preferably of a material having a thermal coefficient of expansion substantially matching that of the lens 42, a suitable exemplary material being stainless steel.

A specific set of exemplary parameter values for the boresight tester 12 of FIG. 2 (relating to the lens 42 and its operative relationship with the target disk 36) has been determined by a computer program and is given below in Table I. It should be understood, however, that these parameter values are merely illustrative, and various other values are also appropriate and may be employed instead.

TABLE I

| Parameter | Specification and/or Design Value |
| --- | --- |
| Thickness of lens 42 | 0.5 inches |
| Material of lens 42 | BK7 glass |
| Radii of curvature for surfaces of lens 42 | 57.0610 inches |
| Separation between lens 42 and target disk 36 | 3.8196 inches |
| Effective focal length of system | 14.3044 inches |
| Clear aperture diameter | 1.8 inches |
| Wavelength range | Visible to 1.06 μm |
| Number of reflections from target surface 38 and coating 44 | 3 |
| Reflectivity of coating 44 | 75% |

The assembly including the target disk 36, the lens 42, and the spacer tube 46 may be firmly held within the housing 30 by means of a stepped clamping ring 48 which may be of brass, for example. The clamping ring 48 has a reduced diameter portion 50 adapted to snugly project into the main body portion of the housing 30 and an enlarged diameter portion 52 of an outer diameter approximately the same as the inner diameter of the housing ring portion 34. The outer circumferential surface of the ring portion 52 and the inner circumferential surface of the ring portion 34 are provided with complimentary threads 53 so that the clamping ring 48 may be screwed into the housing ring portion 34.

An O-ring 54 may be snugly disposed within the housing 30 between the lens 42 and the reduced diameter portion 50 of the clamping ring 48. Thus, when the clamping ring 48 is screwed into the housing ring portion 34, the inner end of the reduced diameter portion 50 will contact the O-ring 54; the lens 42, the spacer tube 46, and the target disk 36 will then be firmly held in shock-resistant fashion within the housing 30. In order to facilitate attachment of the tester 12 to the designator 10, the inner circumferential surface of the enlarged portion 52 of the clamping ring 48 is provided with an annular groove 56 into which an O-ring 58 is snugly seated. O-ring 58 is adapted to slip over an annular rim (not shown) on the designator output surface 18 and into an adjacent retaining groove on the designator 10.

In a boresight testing operation, the tester 12 is attached to the laser designator 10 as shown in FIG. 1, and the laser within the designator 10 is fired. Most of the generated laser beam 14 is reflected by the beam splitter 16 toward the tester 12. As shown in FIG. 3, a portion 59 of the resultant laser beam entering the tester 12 passes through the lens 42, is reflected by the target surface 38 back toward the lens 42, and is reflected by the coating 44 on the lens 42 into a converging path 60 toward the target disk 36. (Most of the laser light entering the tester 12 is reflected back toward the designator 10 by the reflective coating 44 on the lens 42.) Most of the light propagating along path 60 is reflected by the target surface 38 along a further converging path 60a back toward the lens 42, and most of this light is reflected by the coating 44 along a still further converging path 60b toward the target disk 36. Eventually, a portion of the light in the laser beam entering the tester 12 reaches a focal point 62 on the target surface 38.

When the focused laser light impinges upon the target surface 38, a small amount of the target material becomes vaporized, resulting in the emission of visible light. A portion of this emitted visible light then propagates back through the tester 12 along paths 60b, 60a, 60, and 59 in the opposite direction from that described above (and indicated by arrows in FIG. 3) and, after passing through the lens 42, emerges from the tester 12 as a collimated beam. The collimated return beam from the tester 12 then propagates into the designator 10 to the beam splitter 16. A portion of this beam emerges from the beam splitter 16 along axis 20 and travels through the reticle member 24 and the filter 26 to the eyepiece 22.

As shown in FIG. 4, when the designator 10 is properly aligned, visible light emitted from the target surface 38 as a result of the designator test firing will appear as a spot 64 located at the center of the reticle cross hairs 66. However, when the designator is out of alignment, the visible light emitted from the target surface 38 will appear as a spot 64' at a location removed from the center of the reticle cross hairs 66. Thus, the user of the designator 10 is apprised of any boresight misalignment so that the designator can be serviced to correct the alignment problem. Alternatively, if a misaligned designator is already in the field and the alignment problem cannot be corrected locally, the boresight alignment test will enable the user to approximately judge the direction and extent of the misalignment so that, during actual operation, he can aim the designator in an appropriate direction to compensate for the indicated misalignment.

From the foregoing it will be apparent that there has been described a compact, light, rugged, and inexpensive laser designator boresight alignment tester which is quick to install and simple to use. Such a device lends itself to in-the-field testing of the boresight alignment of a portable laser designator.

Although the present invention has been shown and described with respect to a particular embodiment, nevertheless, various changes and modifications which are obvious to a person skilled in the art to which the invention pertains are deemed to lie within the spirit, scope, and contemplation of the invention.

I claim:

1. A device for testing the boresight alignment of a laser designator comprising:
    a housing having a closed end and an open end;
    a target member disposed within said housing adjacent to said closed end and defining a target surface facing said open end, said target surface being of a material capable of emitting visible light when irradiated with laser light;
    a lens disposed within said housing at a location spaced from said target member and having a reflective coating on its surface facing said target surface for directing a portion of the laser light entering said housing through said open end toward said target surface such that after a predetermined number of relections from said target surface and said reflective coating said portion of said laser light is focused to a small area on said target surface;
    a hollow spacer member disposed within said housing between said target member and said lens in abutting relationship with said target member and said lens, said spacer member being of a material having a thermal coefficient of expansion substantially matching that of said lens;
    means for firmly holding said target member, said spacer member, and said lens within said housing; and
    attachment means disposed near said open end of said housing for facilitating attachment of said device to a laser designator.

2. A device for testing the boresight alignment of a laser designator comprising:
    a tubular housing having a closed end and an open end;
    a target disk snugly disposed within said housing adjacent to said closed end and defining a target surface facing said open end, said target surface being of material capable of emitting visible light when irradiated with laser light;
    a lens snugly disposed within said housing near said open end and having a reflective coating on its surface facing said target surface for directing a portion of the laser light entering said housing through said open end toward said target surface such that after a predetermined number of reflections from said target surface and said reflective coating said portion of said laser light is focused to a small area on said target surface;
    a tubular spacer member snugly disposed within said housing between said target disk and said lens in abutting relationship with said target disk and said lens, said spacer member being of a material having a thermal coefficient of expansion substantially matching that of said lens;
    means for firmly holding said target disk, said spacer member, and said lens within said housing; and
    attachment means disposed near said open end of said housing for facilitating attachment of said device to a laser designator.

3. A device for testing the boresight alignment of a laser designator comprising:
    a tubular housing having a closed end and and open end;
    a target disk snugly disposed within said housing adjacent to said closed end and defining a target surface facing said open end, said target surface being of a material capable of emitting visible light when irradiated with laser light;
    a first O-ring snugly disposed within said housing between said closed end and said target disk in abutting relationship with said closed end and said target disk;
    a lens snugly disposed within said housing near said open end and having a reflective coating on its surface facing said target surface for directing a portion of the laser light entering said housing through said open end toward a small area on said target surface such that after a predetermined number of reflections from said target surface and said reflective coating said portion of said laser light is focused to a small area on said target surface;
    a tubular spacer member snugly disposed within said housing between said target disk and said lens in abutting relationship with said target disk and said lens, said spacer member being of a material having a thermal coefficient of expansion substantially matching that of said lens;
    a clamping ring disposed within said housing adjacent to said open end and being threadedly attached to said housing, said clamping ring defining an annular groove on an inner circumferential surface thereof;
    a second O-ring snugly disposed within said housing between said lens and said clamping ring in abutting relationship with said lens and said clamping ring; and
    a third O-ring snugly disposed within said annular groove.

4. A device according to claim 3 wherein said housing defines a main body portion wherein said target disk, said spacer member, and said lens are disposed, and further defines a ring portion adjacent to said open end having a diameter greater than that of said main body portion; and said clamping ring defines an enlarged diameter portion threadedly attached to said ring portion of said housing and a reduced diameter portion snugly projecting into said main body portion of said housing in abutting relationship with said second O-ring.

5. A device according to any of claims 1, 2, 3, or 4 wherein said lens is a converging meniscus lens having a concave surface facing said target surface.

* * * * *